US006533928B1

(12) United States Patent
Terato

(10) Patent No.: US 6,533,928 B1
(45) Date of Patent: Mar. 18, 2003

(54) AQUARIUM CLEANING SYSTEM

(76) Inventor: Kuniaki Terato, 721 4th Ave., Kirkland, WA (US) 98033

( * ) Notice: Subject to any disclaimer, the term of this patent is extended or adjusted under 35 U.S.C. 154(b) by 0 days.

(21) Appl. No.: 10/027,956

(22) Filed: Dec. 20, 2001

(51) Int. Cl.7 .......................... A01K 63/04; C02F 1/00; B01D 35/02
(52) U.S. Cl. .................... 210/169; 210/259; 210/416.2; 210/448; 119/259
(58) Field of Search ................ 210/169, 196, 210/252, 259, 263, 319, 323.1, 332, 416.2, 435, 448, 908, 805; 119/259, 264; 15/1.7

(56) References Cited

U.S. PATENT DOCUMENTS

| | | | | | |
|---|---|---|---|---|---|
| 2,595,965 | A | * | 5/1952 | Ludwick | 119/264 |
| 2,672,845 | A | * | 3/1954 | Schneithorst | 119/262 |
| 3,688,907 | A | * | 9/1972 | Oravec | 210/169 |
| 3,722,685 | A | * | 3/1973 | Orensten et al. | 210/169 |
| 3,814,254 | A | * | 6/1974 | Schatz | 210/169 |
| 4,265,751 | A | * | 5/1981 | Willinger | 210/169 |
| 4,684,462 | A | * | 8/1987 | Augustyniak | 210/97 |
| 5,179,911 | A | * | 1/1993 | Chow et al. | 119/264 |
| 5,190,647 | A | * | 3/1993 | Balestrieri | 210/169 |
| 5,542,451 | A | * | 8/1996 | Foster | 137/625.11 |
| 6,444,120 | B1 | * | 9/2002 | Morgan | 210/169 |

* cited by examiner

Primary Examiner—Fred Prince
(74) Attorney, Agent, or Firm—Janet Sleath; Ann W. Speckman

(57) ABSTRACT

A water circulation and filtration system for maintaining a high level of water quality in aquariums is provided. Preferably the system is used in conjunction with a gravel screen, which is located just above the base of the aquarium. The inventive system comprises a vertical water flushing tube connected to a water supply or a reverse power-head pump and having an opening positioned in proximity to the base of the aquarium and below the gravel screen. A water circulation tube and water draining tube, each of which have openings located immediately above the base of the aquarium and below the gravel screen, are provided at the opposing end of the aquarium. The water circulation tube is connected at its other end to a standard filter, while the water draining tube is connected at its other end to a hose leading to a sink, drain or external container.

9 Claims, 6 Drawing Sheets

AQUARIUM CLEANING SYSTEM

FIELD OF THE INVENTION

This invention is in the field of water circulation and filtration systems for both freshwater and salt-water aquariums.

BACKGROUND OF THE INVENTION

The maintenance of high water quality in aquariums is essential for successfully keeping many breeds of fish and other aquatic organisms. For example, it is the dream of every discus fish hobbyist to decorate their living space with plant-containing aquariums in which large discus fish live comfortably. However, it is not only labor-intensive, but also impractical for amateur hobbyists, or even professional breeders, to keep discus fish in tanks with plants due to the fact that discus require ultra clean water. The major source of contamination in an aquarium tank is debris from leftover food, plant and animal waste accumulated under the gravel, with the resulting release of excessive amounts of toxic metabolites and substances such as ammonium and organic acids from decaying substances. In addition, the presence of such debris promotes the growth of infectious bacteria and fungi. It is therefore strongly recommended that aquariums with discus fish do not contain any kind of bottom substrate in order to avoid the accumulation of debris. The only way to make a more attractive discus tank is to decorate the tank with individually potted plants, thereby lowering the aesthetic quality of the aquarium.

The two filtration systems commonly employed in aquariums are under-gravel and outside power filtration. The under-gravel filtration system provides water flow within and under the gravel, supplying oxygen to the plant roots, and promoting the growth of beneficial nitrogen-fixing bacteria, all of which are required for plant growth. The major drawback of this system is the need to remove all plants and gravel in order to clean the tank, and in particular to clean the bottom of the tank where all debris accumulates. The outside filtration system is less labor-intensive for cleaning and replacing filtration materials. However, debris will gradually accumulate under the gravel, making frequent cleaning of the gravel layer necessary in order to maintain a high level of water quality. There thus remains a need for a filtration system that prevents accumulation of debris at the bottom of the tank.

SUMMARY OF THE INVENTION

This invention provides a water filtration or cleaning system, together with methods for its use, which allows for automatic removal of debris accumulated at the bottom of an aquarium, thereby maintaining high quality water within the aquarium without intensive work.

In one embodiment, the inventive system comprises: (a) a water flushing tube adapted to be positioned at one of the aquarium, the water flushing tube comprising a first generally vertical tubular member connected at one end to a hose for connection to a water supply or to a reverse power-head pump, and connected at the other end to a generally right-angled water jet tube, or connector, having an opening to be positioned in proximity to the base of the aquarium; (b) a water draining tube adapted to be positioned at the opposing end of the aquarium, the water draining tube comprising a second generally vertical tubular member being connected at one end to a hose for the drainage of water out of the aquarium and connected at the other end to a generally right-angled siphon tube, or connector, having an opening to be positioned in proximity to the base of the aquarium; and (c) a water circulation tube adapted to be positioned at the opposing end of the aquarium, the water circulation tube comprising a third generally vertical tubular member being connectable at one end to a filter located outside the aquarium and having an opening to be positioned in proximity to the base of the aquarium. In a preferred embodiment, the aquarium is provided with a gravel screen and the openings of the water flushing tube, water circulation tube and water draining tube are positioned below the screen.

In an alternative embodiment, the water flushing tube is connected to a horizontal tube which is placed along at least one inner side of the aquarium and which has multiple holes placed along its length. Preferably the holes face perpendicular to the bottom of the tank. Similarly, the water circulation and draining tubes are connected to a second horizontal tube having multiple holes along its length and which is placed along at least one opposing side of the aquarium. Preferably the holes in the second horizontal tube face down towards the bottom of the aquarium.

In the inventive methods, water is passed through the water flushing tube, either from the water supply or by means of the reverse power-head pump, and directed towards the opposite side of the aquarium, thereby pushing debris accumulated on the bottom of the aquarium towards the water draining and water circulation tubes. Water and debris are then removed from the aquarium through the water draining tube into an external container or drain and/or through the water circulation tube to the filter. Preferably, water and debris are continually removed from the tank by means of the water circulating tube, with clean water being passed into the aquarium through the water flushing tube and water and debris being removed from the aquarium through the water draining tube as necessary.

Using the inventive system and methods, debris may be effectively removed from an aquarium without removing any objects, such as fish, live plants and gravel, thereby maintaining a high level of water quality cost-effectively and with minimal labor. The inventive system further enables effective use of the biological cleaning effect of the plants, which utilizes animal waste. The water quality in aquariums with densely growing plants is much higher than in a bare aquarium. Using conventional filtering and cleaning systems, the accumulation of debris significantly increases after a certain period and overwhelms the plants' water cleaning ability. Using the inventive system, the accumulation of debris can be readily avoided by routine removal of debris at the aquarium bottom. When plants grow well, their nitrogen uptake is significant and much less water exchange is required.

The above-mentioned and additional features of the present invention and the manner of obtaining them will become apparent, and the invention will be best understood by reference to the following more detailed description, read in conjunction with the accompanying drawings.

DETAILED DESCRIPTION OF THE INVENTION

As outlined above, the present invention provides a water circulation and filtration system for the maintenance of a high water quality within an aquarium which permits automatic removal of debris from the bottom of the aquarium.

Figure 1:
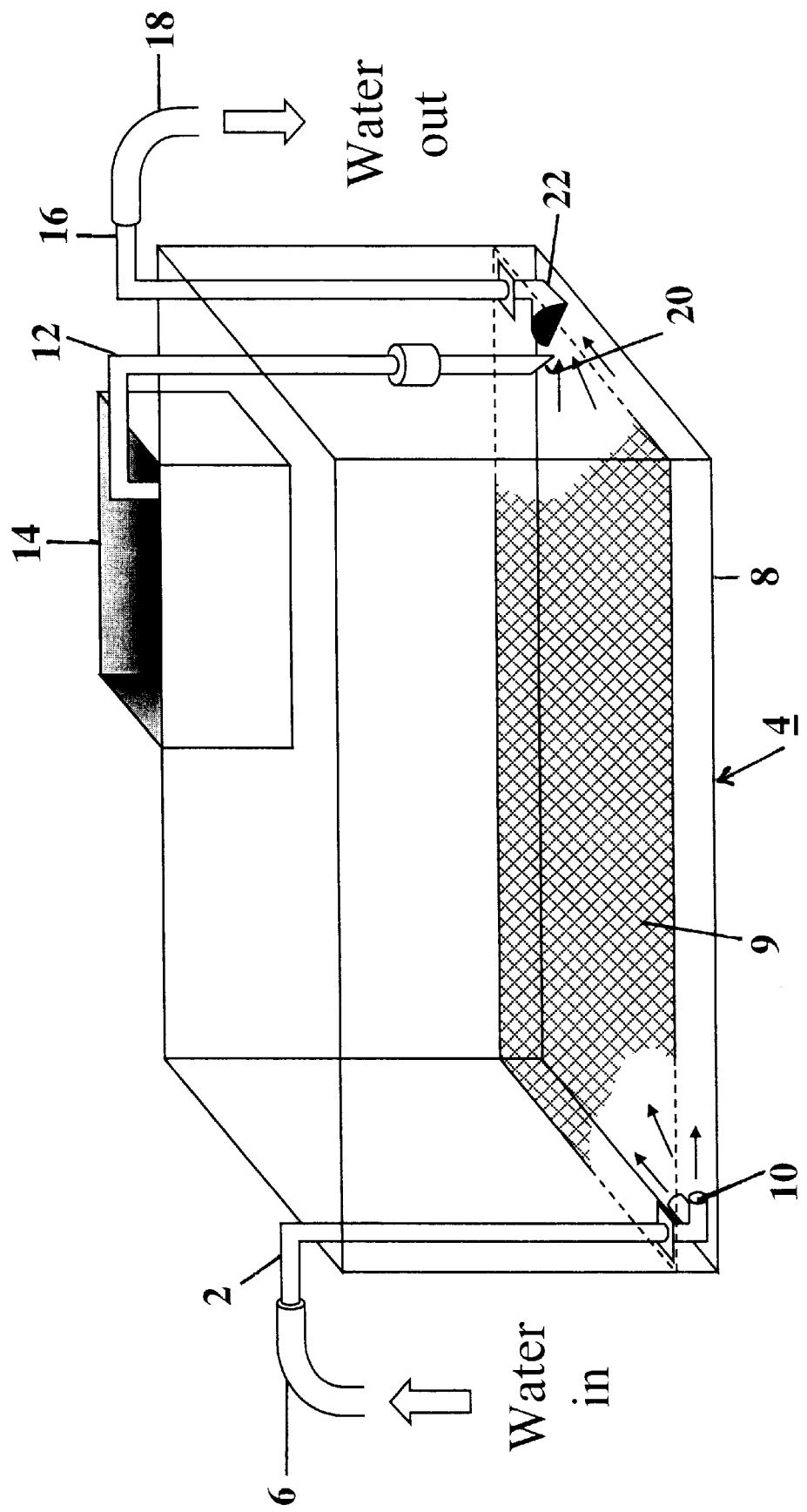
FIG. 1 is a perspective view of an aquarium containing a first embodiment of the water circulation system of the present invention.
Figure 6:
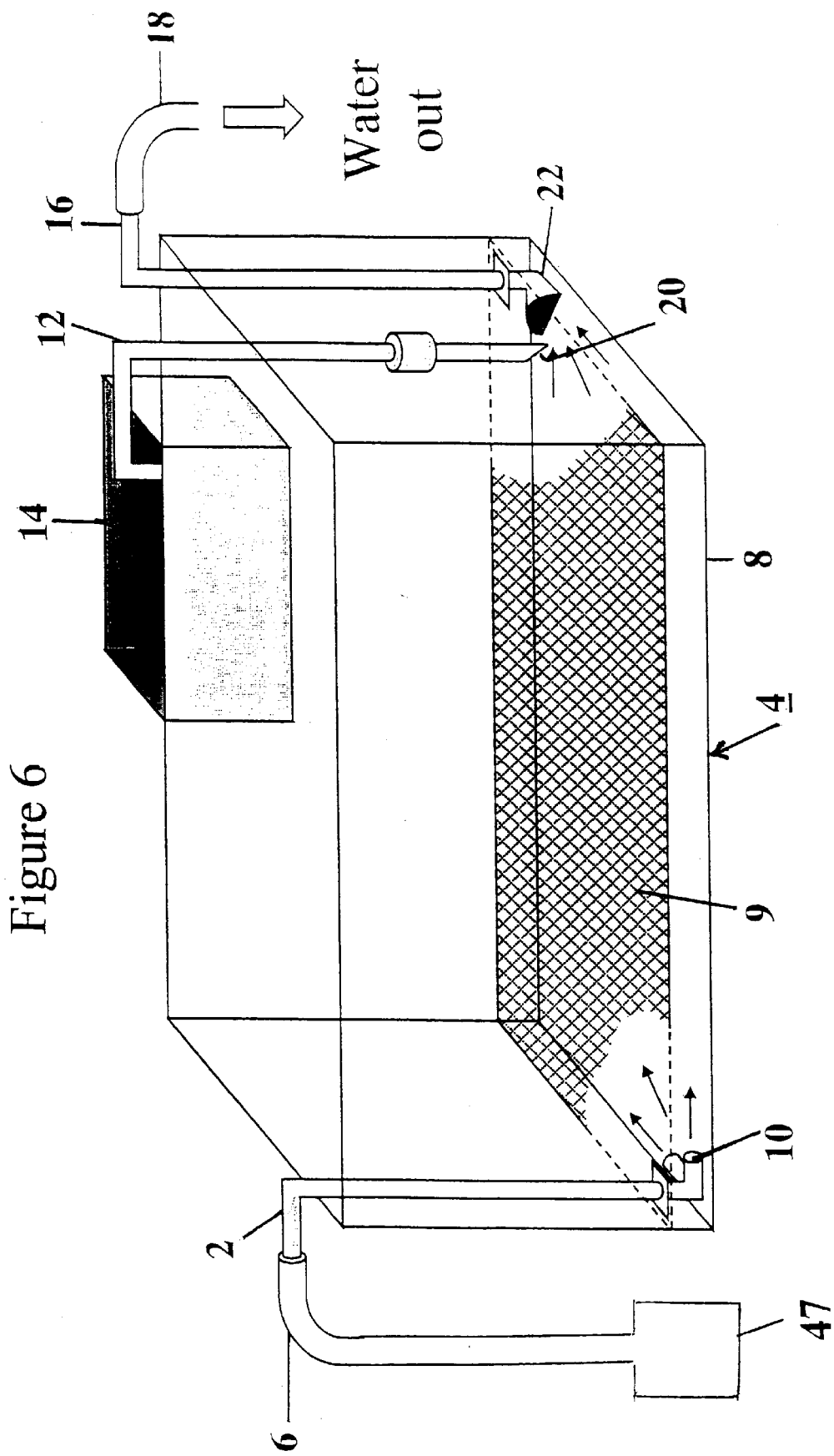
FIG. 6 is a perspective view of an aquarium containing a third embodiment of the water circulation system of the present invention.

The inventive system comprises a water flushing tube, a water circulating tube, and a water draining tube that all open immediately above the bottom of an aquarium. With reference to FIGS. 1 and 6, water flushing tube 2 is mounted generally vertically at one end of aquarium 4 and is connected by means of hose 6 either to a supply of water or to a reverse power-head pump 47. Use of a reverse power-head pump 47 is especially beneficial for salt water aquariums, since the water cannot be flushed. Aquarium 4 is preferably provided with a screen or mesh 9 for supporting gravel. Screen 9 is positioned at least 0.5 cm above, and substantially covers, base 8 of aquarium 4. The screen is preferably constructed of round plastic rods, thereby reducing any dead-space, and maximizing water flow through the screen. Opening 10 of water flushing tube is positioned immediately above base 8 of aquarium 4 and below screen 9.

On the opposite side of aquarium 4, water circulating tube 12 is mounted generally vertically and is connected to an outside filter 14 which has a built-in pump (not shown) or to an outside power filter placed under aquarium 4 (not shown). Outside filter 14 and the power filter may be of any conventional design and act to remove debris from the water. Specifically, water goes to outside filter 14 through water circulating tube 12 and over flows into aquarium 4 from outside filter 14, which is placed on aquarium 4. Similarly, water is aspirated through the water circulating tube 12 to the power filter and pumped up to aquarium 4 from the power filter. Water draining tube 16, also mounted in a generally vertical orientation, is located in proximity to water circulating tube 12 and is connected by means of hose 18 to a sink, drain or external container. Opening 20 of water circulation tube 12 and opening 22 of water draining tube are positioned immediately above base 8 of aquarium 4 and below the screen. In an alternative embodiment, water circulating tube 12 and water draining tube 16, may be connected by a two-way stopcock.

Figure 3:
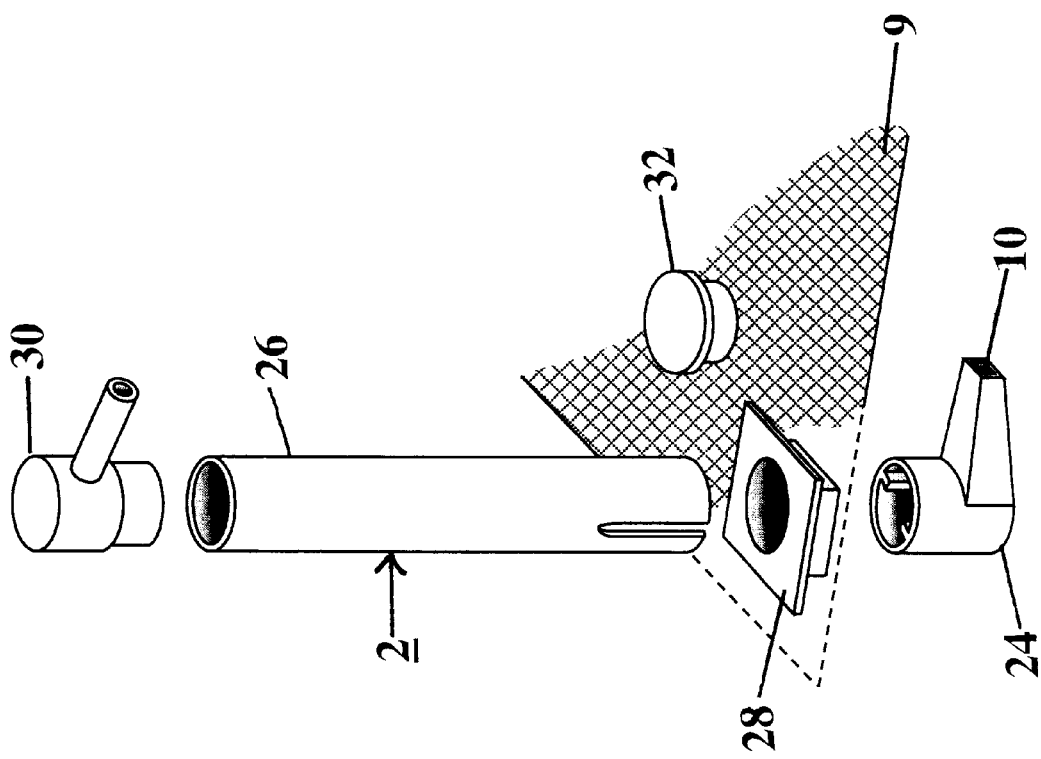
FIG. 3 is an exploded view of a water flushing tube of the present invention.
Figure 4:
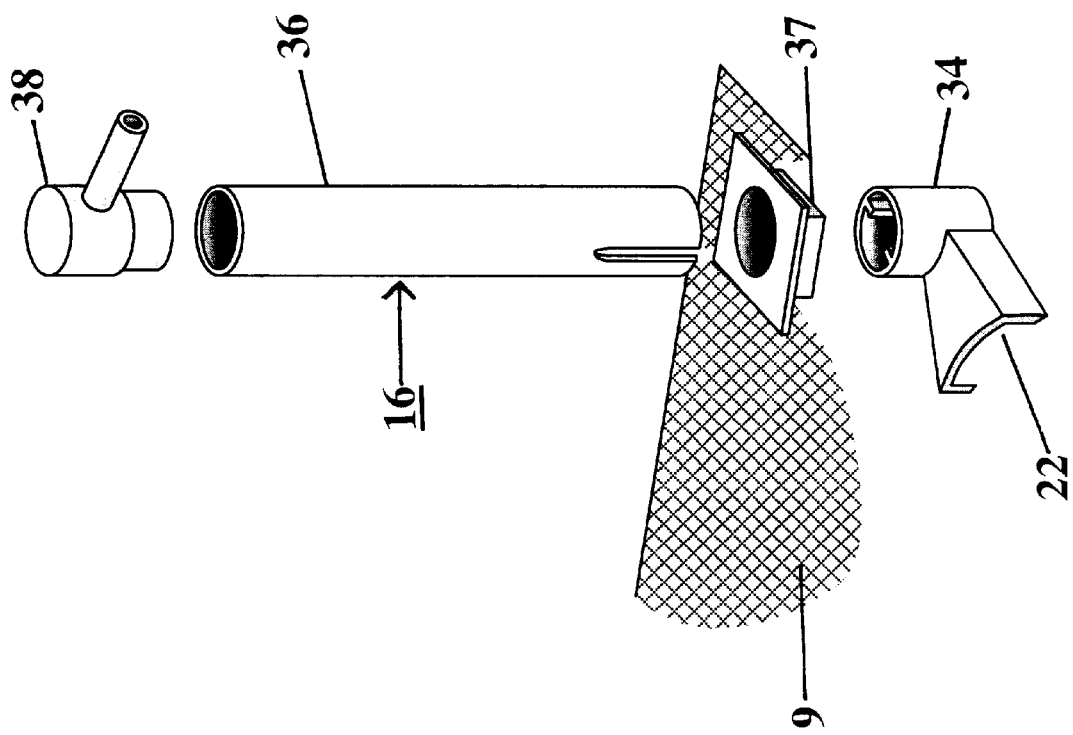
FIG. 4 is an exploded view of water draining tube of the present invention.

As shown in FIG. 3, opening 10 of water flushing tube 2 is preferably provided on connector 24 which is movably mounted on the bottom of tubular member 26 and which may be rotated through an angle of around 90° in order to change the direction of flushing water. Water flushing tube 2 passes through, and is stabilized by, support 28 which is mounted on screen 9. A connecter 30 may be employed to connect tubular member 26 to hose 6 (not shown). In order to maintain the aesthetic quality of the aquarium, tubular member 26 may be removed and replaced with stopper 32 during daily operation. As shown in FIG. 4, water draining tube 16 is preferably constructed in a similar manner to water flushing tube 2, with a wide mouth opening 22 being provided on a connector 34 rotatable through an angle of 90° to permit changes in the direction of debris collection, the connector being mounted upon tubular member 36. Connector 38 may be employed to connect tubular member 36 to hose 18 (not shown). Water draining tube 16 may pass through and be stabilized by support 37 mounted on screen 9.

Figure 5:
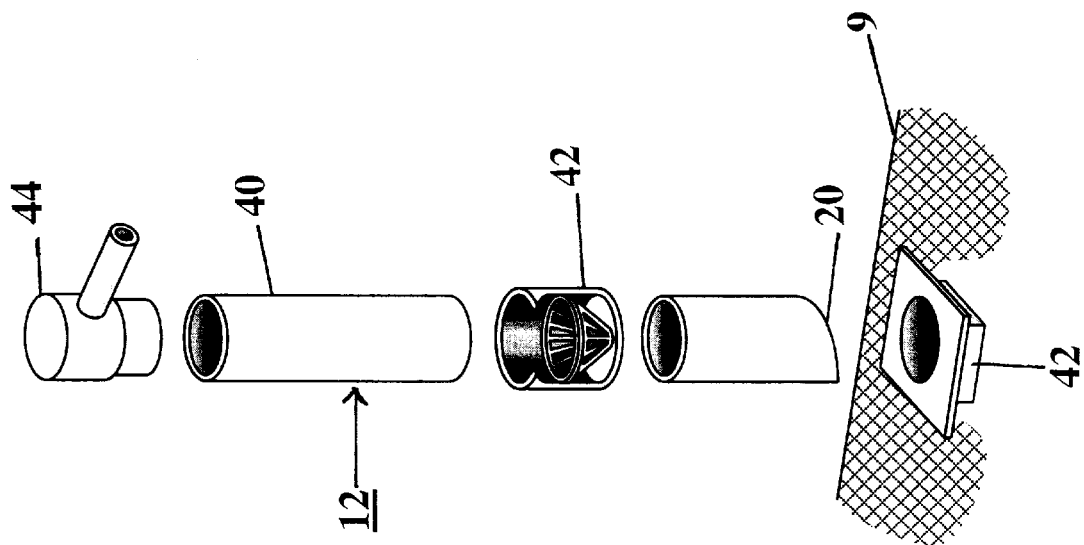
FIG. 5 is an exploded view of a water circulation tube of the present invention with a gravel block.

FIG. 5 shows an exploded view of water circulation tube 12. In the illustrated embodiment, water circulation tube 12 comprises a tubular member 40 having a gravel trap or block 42 to prevent gravel from being drawn up through water circulation tube 12 and into the outside filter. As with water draining tube 16, water circulation tube 12 may pass through and be stabilized by support 42 which is mounted on screen 9. Tubular member 40 may be connected to outside filter 14 directly or to a power filter by means of connector 44.

Water flushing tube 2, water circulation tube 12 and water draining tube 16 may be constructed of any rigid or semi-rigid material suitable for use in an aquarium, such as plastic or stainless steel, and preferably have a diameter of between 1–20 cm. The preferred diameter of the tubes depends, in part, upon the aquarium tank size.

In use, water is passed through water flushing tube 2 and into aquarium 4, thereby pushing debris accumulated on base 8 of aquarium 4 towards water circulation tube 12 and water draining tube 16. Alternatively, debris may be pushed towards water circulation tube 12 and water draining tube 16 by employing a reverse power pump connected to water flushing tube 2 to circulate the water in aquarium 4. The debris may then be siphoned out of aquarium 4 to a sink, drain or external container through water draining tube 16. In addition, by continually running a power pump connected to outside filter 14, debris at base 8 of aquarium 4 may be siphoned out through water circulation tube 12 into outside filter 14 twenty-four hours a day.

Figure 2:
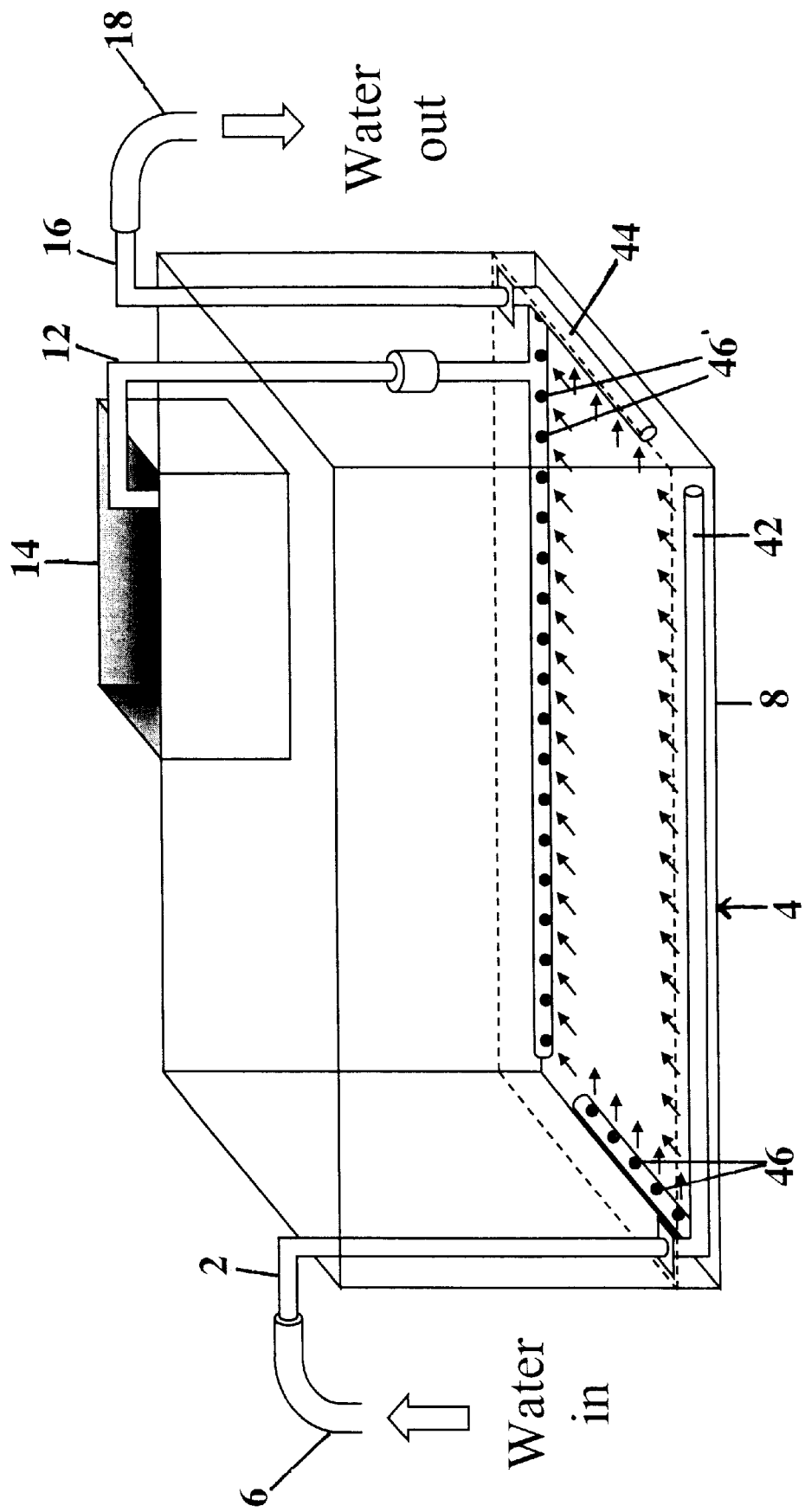
FIG. 2 is a perspective view of an aquarium containing a second embodiment of the water circulation system of the present invention.

In an alternative embodiment shown in FIG. 2, water flushing tube 2, water circulation tube 12 and water draining tube 16 are connected to horizontal tubes 42 and 44 located around the edges of aquarium 4 and between the screen and aquarium base 8. Horizontal tubes 42 and 44 contain multiple holes or perforations, 46 and 46' along their length, which preferably face aquarium base 8. Horizontal tubes 42 and 44 preferably cover substantially all the perimeter of aquarium 4. In use, water is passed through water flushing tube 2, through horizontal tube 42 and out of holes 46, whereby debris accumulated at aquarium base 8 is pushed towards horizontal tube 44. Water and debris are drawn into horizontal tube through holes 46', into water circulation tube 12 and/or water draining tube 16, and thus into outside filter 14 or into hose 18 for disposal in an external drain or container.

EXAMPLE 1

Water flushing, circulation, and draining tubes (radius=20 mm) were mounted vertically and inserted through holes on a standard gravel screen to reach the tank bottom. The gravel screen was placed at 10 mm above the tank bottom. The water circulation tube was connected to a standard outside filter operating 24 hours a day. Three large Amazon Sword plants, five large Giant Sajitaria plants, and several small Chain Amazon plants, which are all resistant to high temperature, were placed in the tank. Water temperature was maintained at 80–82° F. Tap water treated with chloride neutralizer was used without adjusting the pH. One quarter to one third of the water was exchanged once per week. The following fish were kept together for more than 6 months in a 75-gallon tank: 10 discus, 30 cardinal tetra, and 6 orange tetra. Three different types of food (mainly frozen discus food supplemented with Tetra Min™ and Tetra Bits™) were fed two times every day.

Water was consistently clear despite frequent feeding, and the fish were always very healthy and grew rapidly. Two discus paired in this community tank, spawning every week for more than 6 months. They were separated into a 30-gallon tank with the same water filtration system. More than 90% of the eggs hatched consistently.

While in the foregoing specification this invention has been described in relation to certain preferred embodiments, and many details have been set forth for purpose of illustration, it will be apparent to those skilled in the art that the invention is susceptible to additional embodiments and that certain of the details described herein may be varied considerably without departing from the basic principles of the invention.

I claim:

1. A water cleaning system for use in an aquarium having a gravel screen positioned immediately above its base, the system comprising:
   (a) a water flushing tube adapted to be positioned at one end of the aquarium, the water flushing tube comprising a first generally vertical tubular member having a first and a second end, the first tubular member being connected at the first end to a generally right-angled water jet tube having an opening adapted to be positioned in proximity to the base of the aquarium and below the gravel screen, and being connected at the second end to a hose for connection to a water supply or to a reverse power-head pump;
   (b) a water draining tube adapted to be positioned at an opposing end of the aquarium, the water draining tube comprising a second generally vertical tubular member having a first and a second end, the second tubular member being connected at the first end to a generally right-angled water siphon tube having an opening adapted to be positioned in proximity to the base of the aquarium and below the gravel screen, and being connected at the second end to a hose for drainage of water out of the aquarium; and
   (c) a water circulation tube adapted to be positioned at the opposing end of the aquarium, the water circulation tube comprising a third generally vertical tubular member having a first and a second end, the third tubular member having an opening at the first end adapted to be positioned in proximity to the base of the aquarium and below the gravel screen and being connectable at its second end to a filter located outside the aquarium.

2. The system of claim 1, wherein the water jet tube and the water siphon tube are rotatable through an angle of 90°.

3. The system of claim 1, wherein the water circulation tube further comprises a gravel trap.

4. A water cleaning system for use in an aquarium, the system comprising:
   (a) a water flushing tube adapted to be positioned at one end of the aquarium, the water flushing tube comprising a first generally vertical tubular member having a first and a second end, the first tubular member being connected at the first end to a first horizontal tube adapted to be positioned in proximity to the base of the aquarium, and being connected at the second end to a hose for connection to a water supply or to a reverse power-head pump, wherein the first horizontal tube is sized to fit along at least one edge of the aquarium and has multiple openings spaced thereon;
   (b) a water draining tube adapted to be positioned at an opposing end of the aquarium, the water draining tube comprising a second generally vertical tubular member having a first and a second end, the second tubular member being connected at the first end to a second horizontal tube adapted to be positioned in proximity to the base of the aquarium, and being connected at the second end to a hose for drainage of water out of the aquarium, wherein the second horizontal tube is sized to fit along at least one edge of the aquarium and has multiple openings spaced thereon; and
   (c) a water circulation tube adapted to be positioned at the opposing end of the aquarium, the water circulation tube comprising a third generally vertical tubular member having a first and a second end, the third tubular member having an opening at the first end adapted to be positioned in proximity to the base of the aquarium and being connectable at its second end to a filter located outside the aquarium.

5. The water cleaning system of claim 4, wherein the water circulation tube is connected at its first end to the second horizontal tube.

6. An aquarium having a water cleaning system of claim 4.

7. A method for maintaining water quality in an aquarium, comprising:
   (a) providing a water flushing tube at one end of the aquarium, the water flushing tube comprising a first generally vertical tubular member having a first and a second end, the first tubular member having an opening at the first end which is positioned in proximity to the base of the aquarium, and being connected at the second end to a water supply or to a reverse power-head pump;
   (b) providing a water draining tube positioned at an opposing end of the aquarium, the water draining tube comprising a second generally vertical tubular member having a first and a second end, the second tubular member having an opening at the first end which is positioned in proximity to the base of the aquarium, and being connected at the second end to a hose for drainage of water out of the aquarium;
   (c) providing a water circulation tube positioned at the opposing end of the aquarium, the water circulation tube comprising a third generally vertical tubular member having a first and a second end, the third tubular member having an opening at the first end positioned in proximity to the base of the aquarium and being connected at its second end to a filter;
   (d) flushing water from the water flushing tube towards the water draining tubes and water circulation tubes, whereby debris accumulated on the base of the aquarium is pushed towards the water draining tube and water circulation tube, and
   (e) removing water and debris from the aquarium through at least one of the water circulation tube and the water draining tube.

8. The method of claim 7, wherein the aquarium is provided with a gravel screen positioned above the base of the aquarium and the openings of the first, second and third tubular members are positioned below the gravel screen.

9. A method for maintaining water quality in an aquarium, comprising:
   (a) providing a water flushing tube at one end of the aquarium, the water flushing tube comprising a first generally vertical tubular member having a first and a second end, the first tubular member being connected at the first end to a first horizontal tube positioned in proximity to the base of the aquarium, and being connected at the second end to a water supply or to a reverse power-head pump, wherein the first horizontal tube is sized to fit along at least one edge of the aquarium and has multiple openings spaced thereon;

(b) providing a water draining tube positioned at an opposing end of the aquarium, the water draining tube comprising a second generally vertical tubular member having a first and a second end, the second tubular member being connected at the first end to a second horizontal tube positioned in proximity to the base of the aquarium, and being connected at the second end to a hose for drainage of water out of the aquarium, wherein the second horizontal tube is sized to fit along at least one edge of the aquarium and has multiple openings spaced thereon;

(c) providing a water circulation tube positioned at the opposing end of the aquarium, the water circulation tube comprising a third generally vertical tubular member having a first and a second end, the third tubular member being connected at the first end to the second horizontal tube and being connected at its second end to a filter;

(d) flushing water from the water flushing tube towards the water draining tubes and water circulation tubes, thereby pushing debris accumulated on the base of the aquarium towards the water draining tubes and water circulation tubes, and (e) removing water and debris from the aquarium through at least one of the water circulation tube and the water draining tube.

* * * * *